United States Patent [19]
Bierl et al.

[11] 3,876,772
[45] Apr. 8, 1975

[54] METHODS OF INCREASING THE ATTRACTION OF THE GYPSY MOTH, PORTHETRIA DISPAR L

[75] Inventors: Barbara A. Bierl; Morton Beroza, both of Silver Spring, Md.

[73] Assignee: The United States of America as represented by the Secretary of Agriculture, Washington, D.C.

[22] Filed: May 16, 1973

[21] Appl. No.: 360,279

Related U.S. Application Data

[63] Continuation of Ser. No. 88,491, Nov. 10, 1970, abandoned.

[52] U.S. Cl. ................................................ 424/84
[51] Int. Cl. .......................................... A01n 17/14
[58] Field of Search ...................................... 424/84

[56] References Cited
UNITED STATES PATENTS
2,900,756  8/1959  Jacobson .............................. 424/84
3,018,219  1/1962  Jacobson .............................. 424/84

OTHER PUBLICATIONS

Chemical Abstracts, Vol. 56 (1962), p. 14038i–14040i.

Primary Examiner—V. D. Turner
Attorney, Agent, or Firm—M. Howard Silverstein; Max D. Hensley; William E. Scott

[57]  ABSTRACT

The abdominal tips of the gypsy moth, an insect causing extensive damage to forest, shade and fruit trees, contains a sex attractant useful for the survey and control of the insect. The activity of an extract of these tips can be increased in potency two to ten times by treatment of the extract or the hydrocarbon fraction thereof with a solution m-chloroperbenzoic acid.

6 Claims, No Drawings

METHODS OF INCREASING THE ATTRACTION OF THE GYPSY MOTH, PORTHETRIA DISPAR L

This is a continuation, of application Ser. No. 88,491, filed Nov. 10, 1970 now abandoned.

A non-exclusive, irrevocable, royalty-free license in the invention herein described, throughout the world for all purposes of the United States Government, with the power to grant sublicenses for such purposes, is hereby granted to the Government of the United States of America.

This invention relates to a method of increasing the attraction of an extract of abdominal tips of the gypsy moth, which is used to monitor the whereabouts of the insect and thereby help control and prevent the spread of the insect. Since collection of the tips is very expensive, any means which will increase the attraction of the extract can result in a considerable saving of money and efficiency in combating the insect. A large improvement of the attractant's potency will also make dependence on the availability of pupae, the source of the attractant, far less critical. Other objectives will be apparent from the description of the invention.

The gypsy moth is a serious pest of forest, shade, and fruit trees in the Northeastern United States. Gypsy moth caterpillars strip the leaves from approximately 400,000 acres of timber a year. In 1953, they defoliated one and a half million acres of woodland. This damage and the accompanying control measures are very costly. The cost of combating this insect would spiral upward if the moth were to spread to the Allegheny, Appalachian, and Ozark Mountain regions, where much of the Nation's hardwood timberland is located. These areas contain more than 112 million arces of trees that are highly susceptible to damage by the gypsy moth. A single defoliation by caterpillars can kill white pine, spruce, and hemlock. Two defoliations can kill hardwoods. In heavily infested areas caterpillars can quickly strip the leaves from whole forests. This damage, in turn, increases fire and erosion hazards, affects the flow of streams, reduces land and recreational values, and destroys wildlife habitats. Crawling caterpillars are also a nuisance in residential and recreational areas. These are some of the reasons why government authorities have been working since 1906 to control the insect and prevent its spread.

The most economical and effective means of determining the locations of gypsy moth infestations has been through the use of traps baited with the sex attractant of the female moth. Male insects respond by entering the trap and becoming enmired in a sticky substance that prevents their escape. The presence of moths in traps indicates that an infestation is nearby. By pinpointing the locations of the new infestations, the traps show where control measures should be applied and the spread of the insect can therefore be effectively halted. Accordingly, the sex attractant plays a key role in the survey and subsequent control of the gypsy moth. The traps also aid in preventing serious damage within the generally infested area by indicating where unusually large buildups of the gypsy moth populations are taking place. These areas are then treated to prevent the moth from causing excessive damage.

Collection of the sex attractant is very expensive and often must be carried out in Europe. Heavy infestations of the gypsy moth are sought, and female pupae (which are distinguished from male pupae by being larger) are collected. The pupae are allowed to emerge in well ventilated trays, and the moths are then aged for 24 hours. The last two abdominal segments, called tips, are clipped, and these tips are extracted with benzene. The benzene extract is concentrated and then hydrogenated over platinum catalyst to prevent deterioration of the attractant which normally occurs on aging.

The more the population of the moth is suppressed by control measures, the more difficult the search for a heavy infestation becomes. For this reason the lure has been collected in Europe when heavy infestations of the gypsy moth become available there.

Therefore, it is an object of this invention to increase the sex attractant potency of extracts of gypsy moth tips.

According to this invention the foregoing object has been accomplished by treating the whole extract of the tips, or the hydrocarbon fraction of the extract, with a solution of m-chloroperbenzoic acid. This treatment increases the activity of the original extract by a factor of about two to ten times.

The activity of the extracts were tested both in the laboratory and/or in the field. In the laboratory, extract equivalent to a known fraction of a tip in a solvent was injected into a gas chromatogrph equipped with an 18 inch × ¼ inch o.d. column containing 5% SE-30 liquid phase on 60/80 Gas Chrom P at 170°C. The effluent of the gas chromatograph was directed on a rack of male gypsy moths. When the attractant emerged, the number of insects exhibiting copulatory behavior was recorded. The potency of an extract was determined by comparing the number of insects it activated with the number activated by an extract of known potency. In the field, traps containing known and unknown amounts of extract, each treatment being replicated several times, were set out in a field infested with gypsy moths, and the number of insects caugth were recorded at several time intervals. A comparison of the captures with known and unknown extracts provided an estimate of the potency of the unknown extracts.

The following examples, which represent preferred embodiments of this invention, will illustrate the chemical treatment of the extract and the results obtained.

EXAMPLE 1

Samples consisting of 300 microliters of benzene solutions of the crude extracts of tips from field-collected and laboratory-reared insects were treated with 10 microliters of 5 percent m-chloroperbenzoic acid in methylene chloride, and the activities of these treated extracts were compared with those of untreated extracts. (As a blank 10 microliters of methylene chloride was added to the untreated extracts.) The bioassay results and other details are given in Table I.

Table I

Bioassay data on treated and untreated extracts

| Source of Extract | No. of tip equivalents in extract | % activity Untreated | % activity Treated |
|---|---|---|---|
| Field-collected insects | 0.042 | 50 | 85 |
| Field-collected insects | 0.0042 | 0 | 41 |
| Lab-reared insects | 0.00047 | 29 | 59 |

It will be noted that the activity of the treated second sample (41 percent activity) approaches the activity of the untreated first sample (50 percent activity) even though the second sample is a tenfold dilution of the first one (0.0042 vs 0.042 tip).

EXAMPLE 2

An extract containing the equivalent of 50 tips of laboratory-reared moths in 1 ml of benzene was passed through a column containing 6 grams of Florisil activated at 110°C. The hydrocarbon fraction was eluted with hexane, and the remainder of the extract was eluted with 100 percent ether. All the natural biological activity is found in the ether fraction, and none is found in the hydrocarbon fraction. The solvent from the hexane solution was evaporated and the residue dissolved in 5 ml of methylene chloride. Four mg. of m-chloroperbenzoic acid (purified as described by Fieser and Fieser, "Reagents for Organic Synthesis," Interscience Publications, New York, 1967) was added to 2.5 ml of the methylene chloride solution (25 tips) and the mixture was set aside to react overnight (16 hrs) at a temperature suitable to effect reaction. The resulting solution was then extracted once with 1 ml of aqueous sodium bisulfite solution (saturated) and twice with 1-ml portions of 5 percent sodium bicarbonate in water. The methylene chloride solution was dried over anhydrous sodium sulfate. The activity of the resulting treated solution was compared with the activities of the untreated hydrocarbons, the ether fraction (contains the extract components except for the hydrocarbons), and the original extract.

The untreated hydrocarbons were totally inactive.

The treated hydrocarbons were very active. In the field bioassay, 1 tip plus 3 mg "keeper" (a non-volatile inactive material to inhibit volatilization of the active material) attracted an average of 9 moths per trap in 72 hrs and 23 moths in 120 hrs. In the laboratory bioassay, 0.01 tip per ml yielded 77 percent activity and 0.001 tip per ml yielded 57 percent activity.

The ether fraction (original minus hydrocarbons) had good activity. In the field bioassay, 1 tip attracted an average of 6 moths per trap in 72 hrs and 18 moths in 120 hrs. In the laboratory bioassay, 0.01 tip per ml yielded 67 percent activity and 0.001 tip per ml yielded 56 percent activity in lab bioassay.

The original extract also had good activity. In the field bioassay, 1 tip attracted an average of 1 moth in 72 hrs and 8 moths in 120 hrs. In the laboratory bioassay, 0.01 tip per ml yielded 76 percent activity and 0.001 tip per ml yielded 56 percent activity.

Therefore the treatment of the inactive hydrocarbon extract produced material that is biologically active at a level at least the equal of the natural attractant.

EXAMPLE 3

The benzene extract equivalent to 340,000 tips from insects collected in Spain (1969) was evaporated to dryness and the residue dissolved in hexane. The resulting solution was chromatographed through silica gel (activated at 110°C) in the proportion of 10,000 tips per pound of adsorbent. The hydrcarbon fraction was eluted with hexane, and the remainder of the initial extract, including the active, natural material, was eluted with 100 percent ether. The solvent from the combined hexane fractions was removed and the residue dissolved in 340 ml of methylene chloride. To this was added 1.38 grams of purified m-chloroperbenzoic acid, and the solution was set aside to react overnight (16 hours). The mixture was then extracted once with 500 ml of saturated, aqueous sodium bisulfite solution and twice with 500-ml amounts of 5 percent sodium bicarbonate in water. The methylene chloride solution was then passed through 28 grams of alumina adsorbent (containing 7 percent water) and 20 grams of anhydrous sodium sulfate.

Laboratory bioassay was used to compare the potency of the attractant generated from the inactive hydrocarbon fraction with that of the original natural attractant. The activated hydrocarbon fraction was ten times more active than the original material.

The foregoing examples and teachings are meant to be illustrative rather than limiting. It is well known in the art that the optimum production of an active material will depend on a balance of conditions. For example, a higher concentration of the m-chloroperbenzoic acid reacting for a shorter time interval can achieve the desired result. It is also understood that various modifications, such as the use of another solvent or temperature and even another oxidizing agent, may be employed; or the acid may be removed by a means other than extraction with sodium bisulfite and sodium bicarbonate, e.g., passage over alumina without prior extraction. It is further understood from the art of controlling insects that the activated attractant may be formulated with other solvents, granules (for control), additives such as volatility inhibitors or stabilizers, insecticides, chemosterilants, hormones, or other insect control agents without departing from the disclosures of this invention.

We claim:

1. A method of increasing the sex attractancy of a benzene extract of female gypsy moth tips comprising adding to said extract an effective reactant amount of m-chloroperbenzoic acid and allowing the tips and the m-chloroperbenzoic acid to remain in reactive contact for a time and at a temperature suitable to effect reaction and yield a product having from two to ten times the sex attractancy of the untreated extract.

2. The method of claim 1 wherein the m-chloroperbenzoic acid is a 5 percent solution in methylene chloride.

3. The method of claim 2 wherein the unreacted extract contains the equivalent of 0.042 gypsy moth tips.

4. The method of claim 2 wherein the unreacted extract contains the equivalent of 0.0042 gypsy moth tips.

5. The method of claim 2 wherein the unreacted extract contains the equivalent of 0.00047 gypsy moth tips.

6. A method of treating the biologically inactive hydrocarbon fraction of an extract of female gypsy moth tips to make said fraction an active sex attractant for gypsy moths, said fraction being obtained by absorbing the extract on a column of an adsorbent selected from the group consisting of activated magnesium silicate and activated silica gel, eluting a hydrocarbon fraction of the extract from the column with hexane and evaporating off the hexane to obtain said hydrocarbon fraction, said method comprising, dissolving the hydrocarbon fraction in methylene chloride, adding an effective reactant amount of m-chloroperbenzoic acid to the methylene chloride solution of the hydrocarbon fraction, allowing the fraction and the acid to remain in reactive contact for a time and at a temperature suitable to effect reaction to yield a product having sex attractant properties.

* * * * *